United States Patent [19]

Yopp et al.

[11] Patent Number: 5,120,982
[45] Date of Patent: Jun. 9, 1992

[54] FAULT CORRECTING CIRCUIT

[75] Inventors: Wilford T. Yopp, Canton; John A. Glab, Taylor; Sam M. Mackool, Berkley, all of Mich.

[73] Assignee: Ford Motor Company, Dearborn, Mich.

[21] Appl. No.: 436,401

[22] Filed: Nov. 14, 1989

[51] Int. Cl.⁵ .................................. B60G 17/00
[52] U.S. Cl. ........................... 307/10.1; 324/418; 364/424.01
[58] Field of Search ........... 307/10.1; 280/707; 264/424.03, 424.05, 424.01; 324/73.05, 418; 340/438, 441

[56] References Cited

U.S. PATENT DOCUMENTS

| | | | |
|---|---|---|---|
| 4,516,076 | 5/1985 | Pillari et al. | 324/418 |
| 4,526,401 | 7/1985 | Kakizaki et al. | 364/424 |
| 4,621,833 | 11/1986 | Soltis | 280/707 |
| 4,624,477 | 11/1986 | Kumagai et al. | 280/707 |
| 4,629,212 | 12/1986 | Takizawa et al. | 280/707 |
| 4,648,622 | 3/1987 | Wada et al. | 280/707 |
| 4,655,440 | 4/1987 | Eckert | 280/707 X |
| 4,666,180 | 5/1987 | Shirakuma | 280/707 |
| 4,673,194 | 6/1987 | Sugasawa | 280/707 |
| 4,691,284 | 9/1987 | Izumi et al. | 364/424 |
| 4,700,303 | 10/1987 | Tokuyama et al. | 364/424 |
| 4,714,271 | 12/1987 | Buma et al. | 280/707 |
| 4,718,695 | 1/1988 | Kawagoe | 280/707 |
| 4,763,222 | 8/1988 | Heaston et al. | 361/187 |
| 4,789,935 | 12/1988 | Buma et al. | 364/424.05 |
| 4,805,923 | 2/1989 | Soltis | 280/707 |
| 4,827,416 | 5/1989 | Kawagoe et al. | 364/424.05 |

*Primary Examiner*—A. D. Pellinen
*Assistant Examiner*—J. A. Gaffin
*Attorney, Agent, or Firm*—Raymond L. Coppiellie; Roger L. May

[57] ABSTRACT

A circuit for correcting a fault in an automotive system having at least two operating states includes an actuator mechanism for placing the system into one of at least two operating states and a switching mechanism, such as a relay, operatively connected with the actuator mechanism for driving the actuator mechanism upon passing a current through the switching mechanism. The circuit further includes a fault warning mechanism for detecting an inability of the actuator to place the system into a desired operating state and for generating a fault warning signal in response to the detection as well as a control unit for activating the switching mechanism according to a predetermined sequence upon generation of the fault warning signal to correct the inability of the actuator mechanism to place the system into a desired operating state.

17 Claims, 6 Drawing Sheets

FAULT CORRECTING CIRCUIT

BACKGROUND OF THE INVENTION

1. Field of the Invention

This invention relates generally to a circuit for correcting faults in automotive systems having at least two operating states. More particularly, this invention relates to a circuit for correcting faults in a suspension system including adjustable suspension units having multiple operating states.

2. Disclosure Information

Many systems within an automotive vehicle function between two or more operating states. An example of one such system is a suspension system including multistable automotive suspension units. Suspension units defined as "multistable" can be operated in a plurality of predetermined states. Such suspension units provide control of vehicle ride and handling which may be tailored to particular road surfaces and/or driver characteristics. In typical fashion, a particular state chosen for the multistable unit is determined by a control algorithm with inputs from a variety of vehicle parameters. For example, it is known to control a multistable suspension unit by utilizing vehicle linear acceleration, braking, steering activity, and vehicle speed as well as through a manually operable mode switch. U.S. Pat. No. 4,621,833, assigned to the assignee of the present invention, discloses a system for operating multistable suspension units, including feedback of the operating mode of each suspension unit.

Typically in these types of systems, an actuator associated with a switching device places the system into the desired operating state. If the actuator fails to place the system into the desired state, the system may generate an error message and simply shut down until serviced. Systems which compensate for the failure of the actuator to place the system into a desired have been proposed. U.S. Pat. No. 4,700,303 discloses a system for operating a vehicle height adjusting apparatus in the event that an abnormality is detected in the air suspension system of the vehicle. If such abnormality is detected, the control system operates a compressor until a minimum pressure is produced in the suspension units. Similarly, it is known to compensate for loss of ability to control one or more of the suspension units in an automotive vehicle by placing all of the units in a predetermined control position. U.S. Pat. Nos. 4,526,401 and 4,666,180 disclose two control systems in which the inability to operate adjustable suspension units is compensated for by the placement of all the operational suspension units into a "normal" damping force condition. Although such control systems may cope with the loss of control of a suspension unit to a certain extent, the control scheme set forth in the '303, '401 and '180 patents do not disclose means for correcting the faults causing the inability of the suspension units to achieve the desired operating states.

U.S. Pat. No. 4,805,923, assigned to the assignee of the present application, discloses a control system for governing a plurality of multiple operating mode adjustable suspension units. The control system includes a warning means for detecting the inability of an adjustment means to adjust one or more of the suspension units and for generating a warning signal in response to such detection. The control system determines the extent to which the ability to adjust the suspension units has been impaired by commanding the adjustment means to sequentially place the units into at least two of the multiple operating modes and by observing the responses of the suspension unit to these commands. A mode selection means compares the results of the sequential operation of the suspension units by a diagnostic means to a rank order of states of impairment of the suspension unit and selects an obtainable operating mode which is preferred according to such rank order. The control system uses an algorithm which ranks the operating modes of the suspension system to determine which is the best based upon the unit's inability to adjust. However, the '923 patent discloses no means for correcting the inability of the suspension units to be placed into the desired operating states.

U.S. Pat. No. 4,516,076 discloses a fault detection arrangement for a relay switching system in an automatic test system. The test points in a unit under a test are connected to test instruments by the programmed closure of electromechanical relay contacts. A detector circuit is coupled to the interconnected relay contacts which compares a voltage or resistance present on the interconnected relay contacts to a threshold. If a difference between the signal on the interconnecting relay contacts and that threshold persist for a predetermined period, an interrupt signal is generated which prevents further closure of the relay, avoiding failures of the unit under test. There is no teaching or suggestion in the '076 patent of correcting a fault generated by an actuator of the system.

It is, therefore, an object of the present invention to provide a circuit for correcting faults in automotive systems, the circuit having the ability to detect an inability of the system to be placed into one of at least two operating states and to correct that inability.

It is a further object of the present invention to provide such a circuit for correcting faults in an automotive suspension system having multistable adjustable automotive suspension units, the circuit having the ability to detect an inability of the units to be placed into a desired operating state and to correct that inability.

It is an advantage of the present invention that a circuit according to this invention will correct the inability of a suspension unit to be placed into a desired operating state and will minimize the degradation of ride control over the vehicle in the event that one or more of the adjustable suspension units becomes inoperative.

Other objects features and advantages of the present invention will become apparent to those skilled in the art to which this invention pertains.

SUMMARY OF THE INVENTION

In accordance with this invention, a circuit for correcting a fault in an automotive system having at least two operating states includes actuator means for placing the system into one of the two operating states and relay means, operatively connected with the actuator means, for driving the actuator means upon passing a current through the relay means. A circuit of the present invention further includes fault warning means for detecting an inability of the actuator means to place the system into desired operating state and for generating a fault warning signal in response to the detection as well as control means for activating the relay means according to a predetermined sequence upon generation of the fault warning signal to correct the inability of the actuator to place the system into the desired operating state.

The fault warning means further includes a feedback circuit for sensing the position of the actuator means and generates a fault warning signal either upon a failure of the relay means to pass current to the actuator means or upon a failure of the actuator means to place the system into the desired operating state.

A circuit according to this invention activates the relay means according to a predetermined sequence having the steps of: (a) alternatively activating and deactivating the relay means to correct the inability of the system to be placed into the desired state and recording the number of activations and deactivations by a counter means; (b) evaluating the operating state of the system to determine whether the system is placed into the desired state; and (c) generating a fault signal if the system is not in the desired operating state after the counter means reaches a predetermined value. By alternatively activating and deactivating the relay means, a circuit of the present invention corrects a fault in a system by removing any possible contaminants on any of the contacts within either of the relays. The activations and deactivations may also free an actuator which has frozen into an undesired position. A circuit of the present invention is suitable for use in a suspension system having a plurality of adjustable, multiple operating mode suspension units.

A method for correcting a fault in an automotive system having at least two operating states, includes the steps of: (a) detecting an inability of the system to be placed into the desired operating state; and (b) alternatively activating and deactivating the relay means according to a predetermined sequence to correct the inability of the system to be placed into the desired state. The step of alternatively activating and deactivating the relay means further includes the steps of: (a) evaluating the system's desired operating state and activating the primary relay in response to that desire for a first predetermined amount of time to drive the actuator means into the desired operating state; (b) evaluating the operating state of the system to determine whether the system is placed in the desired operating state; (c) deactivating the primary relay for a second predetermined amount of time and adjusting the primary relay counter if the system is not in the desired state; (d) determining whether the primary relay counter has reached a predetermined value and repeating each of steps (a)-(c) until the primary relay counter reaches a predetermined value; (e) activating the secondary relay for a third predetermined amount of time when the primary relay counter reaches the predetermined value and adjusting the secondary relay counter if the system is not in the desired state; (f) deactivating the secondary relay for a fourth predetermined amount of time; (g) repeating each of steps (a)-(f) until the secondary relay counter reaches the second predetermined value; and (h) generating a fault signal when the secondary relay counter reaches the second predetermined value.

DETAILED DESCRIPTION OF THE PREFERRED EMBODIMENTS

Figure 1:
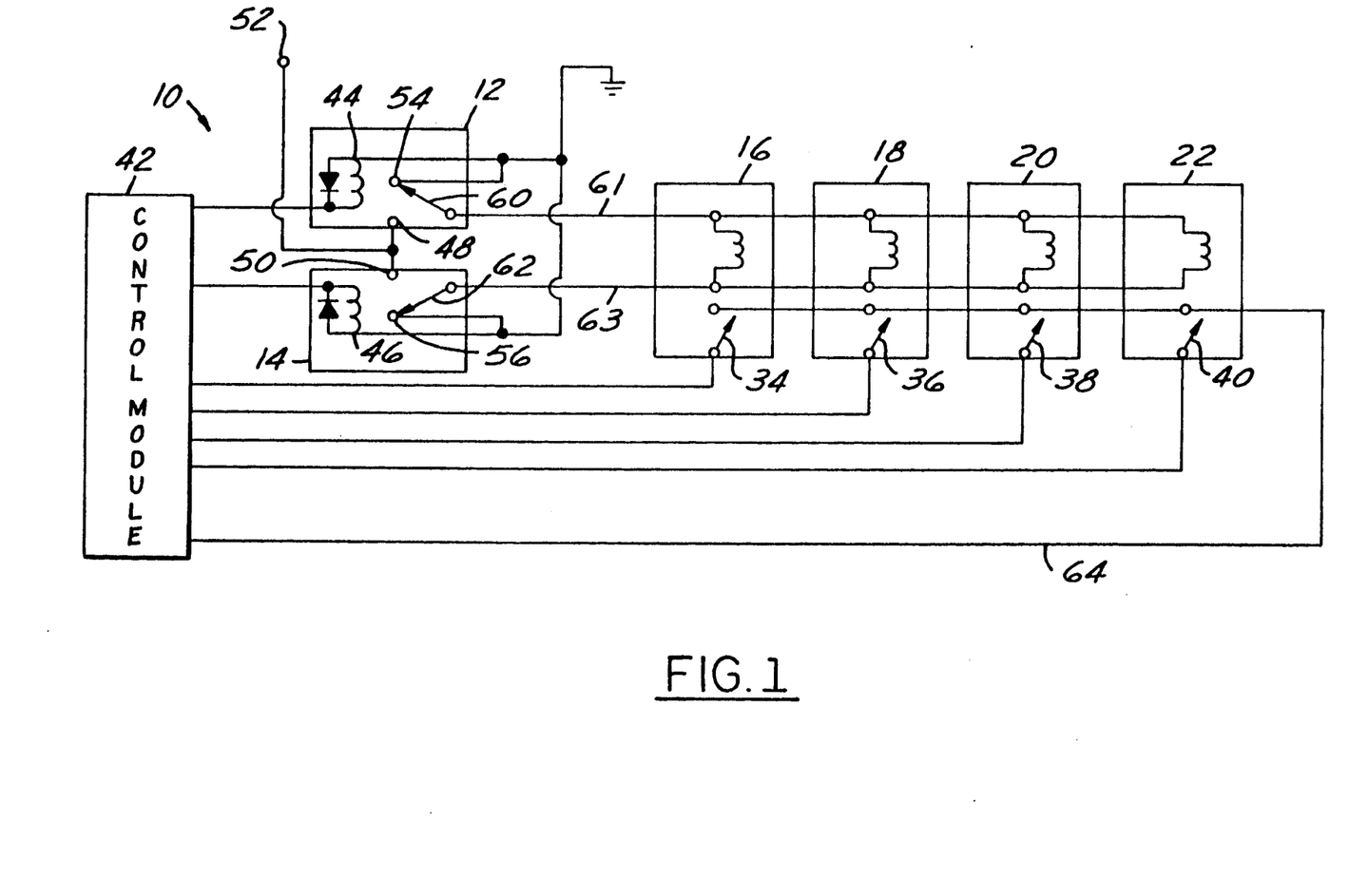
FIG. 1 is an electrical schematic diagram of a circuit of the present invention.

As is shown in FIG. 1, a circuit 10 for correcting a fault in a system having two operating states includes a pair of relays 12, 14 connected with actuators 16, 18, 20 and 22. Actuators 16, 18, 20 and 22 place the system into either of the operating states depending on which of the relays 12, 14 is activated. FIG. 1 illustrates a system employing four actuators, however, it will be apparent to those skilled in the art that any number of actuators may be used. Furthermore, a system employing a circuit of the present invention may include more than two operating states, wherein the circuit 10 of the present invention would include an equal number of relays so that each relay corresponds to each of the operating states. The circuit 10 of FIG. 1 can be used in any automotive system having at least two operating states, such as a suspension system having multiple operating mode adjustable suspension units, wherein the suspension units are adjustable between two damping positions. One type of such system is shown in FIG. 6.

Figure 6:
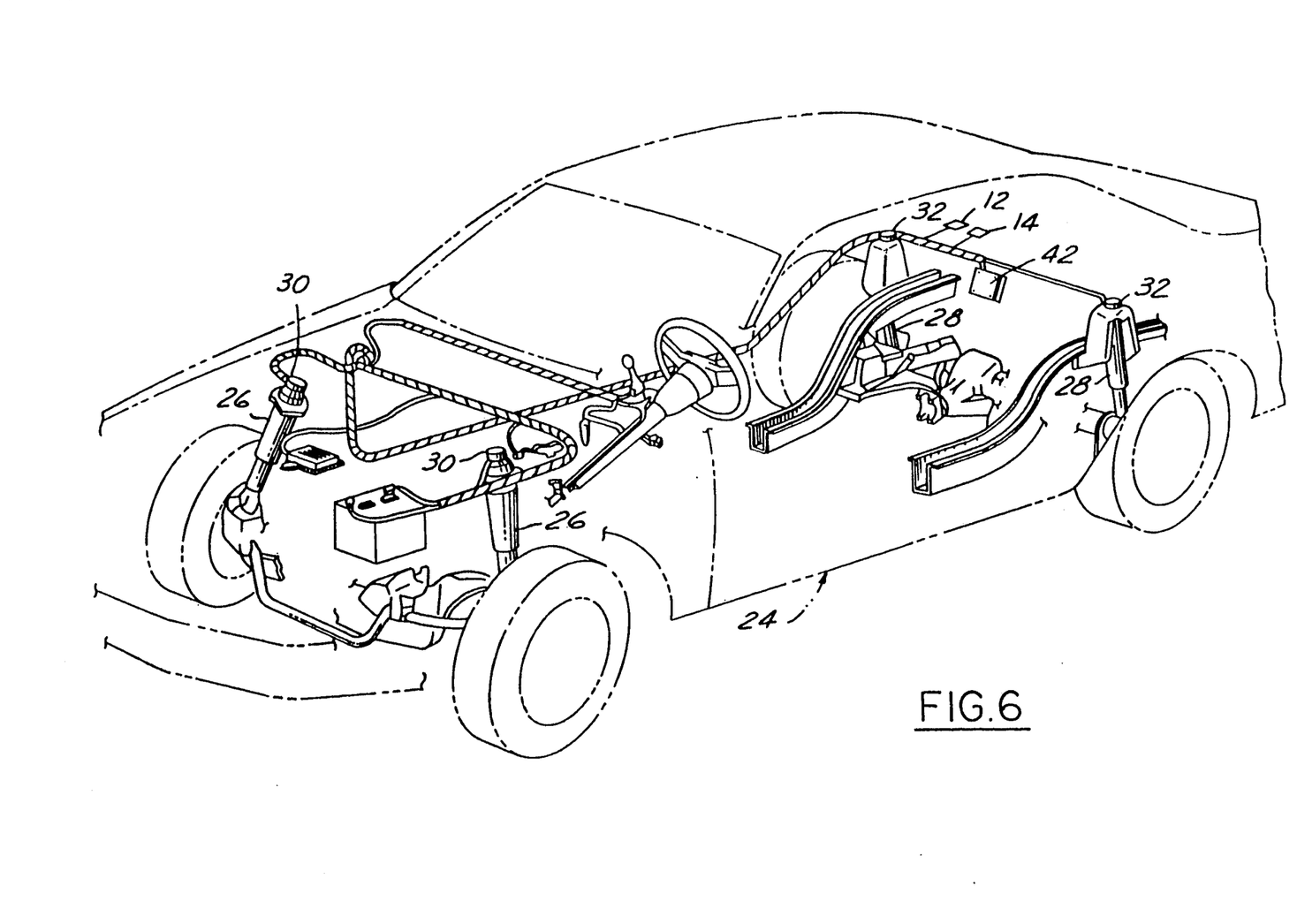
FIG. 6 is a perspective drawing of a motor vehicle incorporating a suspension system employing a circuit of the present invention.

FIG. 6 shows a motor vehicle 24 equipped with adjustable front struts 26 and rear shock absorbers 28. In conventional fashion, the front struts 26 help to control the attitude of the front of the vehicle while the rear shock absorbers 28 help to control the attitude of the rear of the vehicle. A preferred construction for adjustable struts 26 and shock absorbers 28 is disclosed in U.S. Pat. No. 4,313,529 and comprises a rotary valve positioned within one of the passageways running through the piston. The rotary valve functions to vary the effective cross-sectional area of the passageway, thus providing an adjustable damping force.

In a suspension system as shown in FIG. 6 employing a circuit of the present invention, the adjustment of damping force is made by a rotary actuator. Such actuators 30, 32 are shown as being attached to the uppermost portion of front struts 26 and rear shock absorbers 28. The construction of front actuators 30 and rear actuators 32 is described in detail in U.S. Pat. No. 4,621,833, the disclosure of which is hereby incorporated by reference.

The suspension system shown in FIG. 6 represents merely one type of automotive system employing the present invention, it being understood that the present invention is suitable for use with other types of suspension units such as air, air/hydraulic, hydraulic load bearing units or combination load bearing and damping units such as those known in the art. In view of this disclosure those skilled in the art will further appreciate that the present invention could be applied preferentially to the suspension units located at only one end of the vehicle such as the front or rear by connecting only two actuators to the circuit instead of the four as shown in FIG. 1.

Returning now to FIG. 1, circuit 10 further includes feedback switches 34, 36, 38 and 40 associated with each of the actuators 16, 18, 20 and 22 respectively. The feedback switches detect whether the actuators have moved into a requested operating state and generate a feedback signal indicating the actual position of the actuators. The circuit 10 also includes a control module 42 which receives the feedback signals generated by the feedback switches and compares the feedback signal to the desired operating state required by the system. Suspension control module 42 generally comprises a microprocessor. The microprocessor generally comprises an input interface, a central processing unit (CPU), a readable addressable memory (RAM), a read only memory (ROM) and an output interface. It has been determined that a Type A797 microprocessor by Intel Corp. is useful for practicing the present invention. Those skilled in the art will appreciate in view of this disclosure that other types of microprocessors may be useful for practicing this invention.

If the feedback signal does not correspond to the desired operating state, the control module 42 generates a fault signal in response to the inability of the actuators to be placed into the desired state. Upon generation of the fault signal, the control module activates relays 12, 14 according to a predetermined sequence in an attempt to correct the inability of the actuators to be placed into the desired operating state. The predetermined sequences, contained in a software program within the control module, are shown in FIGS. 3A, 3B, 5A and 5B and will be discussed later.

Each of the relays 12, 14 includes a coil 44, 46 which generates a magnetic field when a current is passed through it, a normally open contact 48, 50 connected to a voltage source 52 and a normally closed contact 54, 56 connected to a voltage ground 58. Each of the relays 12, 14 further includes a movable contact 60, 62 which moves between the respective normally closed contact 54, 56 and the normally open contact 48, 50 upon energization of coils 44, 46. The circuit formed by relays 12 and 14 for activating the actuators will hereinafter be referred to as the activation circuit 61, 63. Those skilled in the art will appreciate that other types of switching mechanisms, such as transistors, could also be used in the present invention.

In the circuit shown in FIG. 1, each relay 12, 14 corresponds to a specific operating state of the system in which they are employed. For example, in the suspension system shown in FIG. 6, including suspension units having multiple operating mode states, each of the relays 12, 14 corresponds to a different damping position of the suspension unit. The suspension units shown in FIG. 6 may be operated between a firm damping position and a normal damping position. Relay 12 could correspond to the firm damping position operating state while relay 14 corresponds to the normal damping position operating state. The designation of one relay corresponding to a specific operating state is arbitrary and the example of firm and normal damping position operating states used in this application is not meant as a limitation upon the present invention; it is merely used as an example. For purposes of clarity, the relay corresponding to the desired operating state will be denoted as the primary relay while the relay corresponding to the nondesired state will be denoted as the secondary relay. Depending upon which operating state is desired, either relay 12 or relay 14 would be the primary relay and the other relay would be the secondary relay. In this specification, relay 12 will be designated as the primary relay corresponding to the desired operating state, although this is not meant as a limitation upon the present invention.

When the desired operating state is required, current is passed from the control module 42 through coil 44 to energize relay 12, the primary relay as designated for example purposes. Passing a current through coil 44 generates a magnetic field causing movable contact 60 to move from its normally closed position against contact 54 to the normally open contact 48. This causes current to flow in the activation circuit 61, 63 but only if the secondary relay 14 completes the electrical circuit by providing the ground for the activation circuit 61, 63. The secondary relay 14 completes ground since movable contact 62 remains against normally closed contact 56 to complete the circuit to voltage ground 58. If there is no fault within the system the primary relay 12 activates each of the actuators 16, 18, 20 and 22 to place the system into the desired operating state. The feedback switches 34, 36, 38 and 40 generate a feedback signal received by control module 42 through position sense return line 64. Control module 42 determines whether the actuators are in the desired operating state by comparing the feedback signal to the desired position of the actuators. It should be apparent to those skilled in the art that each relay may only be used to activate selected actuators. It is not meant as a limitation of the present invention that relays 12, 14 activate all of the actuators 16, 18, 20 and 22.

A fault may be generated in the circuit 10 of FIG. 1 if the relays 12, 14 are not energized when a current is passed through the relays, if the activation circuit is not passing current or if any of the actuators 16, 18, 20 or 22 are not placed into the desired operating state when activated by properly functioning relays. Failure of current to pass through the activation circuit to the actuators may be due to insufficient contact between the movable contact and either the normally closed contact or the normally open contact. This type of fault may be due to the presence of contaminants on either the movable contact, the normally open or normally closed contacts or to poor mechanical orientation between the contacts. A fault resulting from the failure of the actuator to go into the desired operating position when the relays are functioning properly may be a result of an actuator, such as the rotary actuator of U.S. Pat. No. 4,621,833, sticking or freezing into one position due to any number of reasons, such as contamination. The control module 42 detects the inability of the actuators to be placed into the desired state by comparing the feedback signal to the desired position of the actuators as described above.

Figure 2:
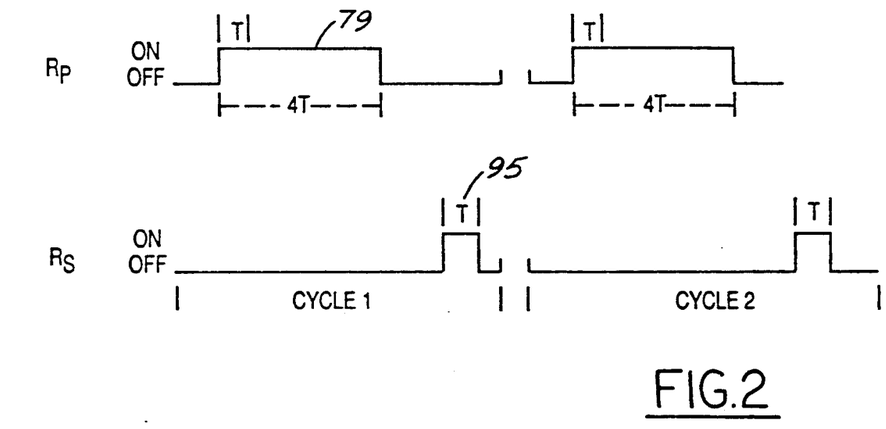
FIG. 2 illustrates an output waveform of a system employing a circuit of the present invention and operated in accordance with one method of the present invention.
Figure 3A:
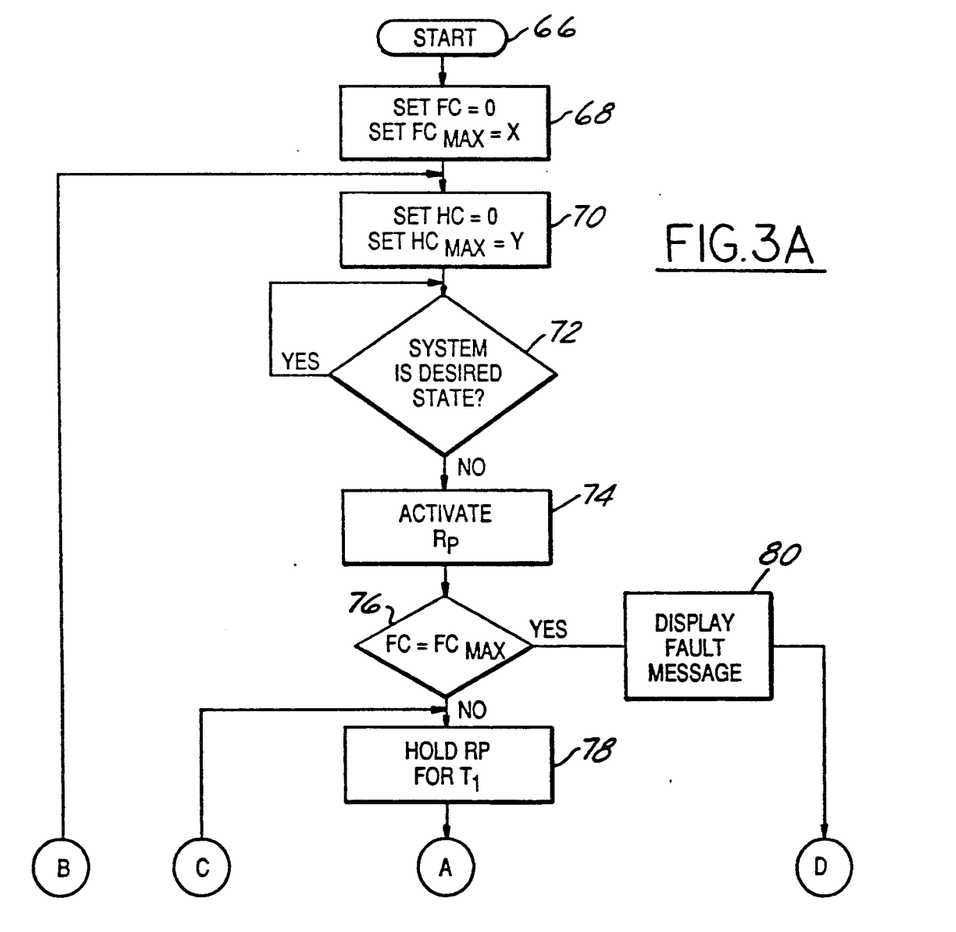
FIGS. 3A and 3B are logic flow block diagrams corresponding to the method illustrated by the output waveform of FIG. 2.
Figure 3B:
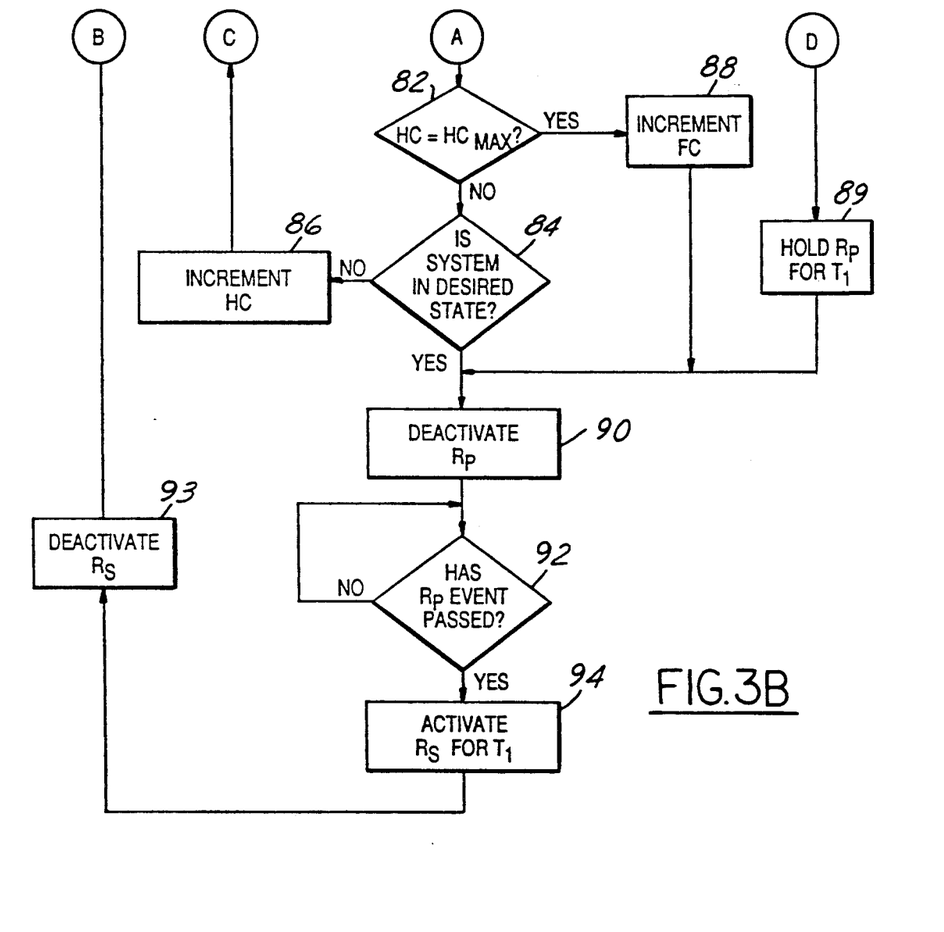

When control module 42 receives the feedback signal from the feedback switch and determines a discrepancy between the desired and actual operating states, the control module activates and deactivates relays 12, 14 according to predetermined sequence in an attempt to correct the fault. One such predetermined sequence is shown as the waveform of FIG. 2 and as a logic flow block diagram in FIGS. 3A and 3B. In FIGS. 2 and 3 the following abbreviations are used:

$R_p$ is the primary relay;
$R_s$ is the secondary relay;
FC is a fault counter which counts the number of fault signals generated whenever the circuit is activated and the actuators fail to go into the desired operating state;
$FC_{max}$ is a predetermined maximum value of generated fault signals such that when the fault counter reaches this value, the system flags an error message;

HC is a hold counter, similar to a timer, which continuously holds the activation of the relays for predetermined time periods; and $HC_{max}$ is a predetermined maximum value for holding either of the relays for a predetermined length of time.

The predetermined sequence illustrated by FIGS. 2 and 3A and 3B is an event dependent sequence. By event dependent sequence, it is meant that a separate event requiring a new desired operating state generates a new cycle of activations of the relays. For example, in the suspension system illustrated in FIG. 6, separate suspension events may be a hard braking, a relatively straight, smooth road surface, an acceleration, an undulating road surface, or a hard steering angle. Each of these events requires the system to choose an operating state such that the circuit must be energized to place the actuators into that desired operating state. The sequence illustrated in FIGS. 2 and 3 will not flag an error message until a predetermined number of these events occur.

Referring now to FIGS. 3A and 3B, a simplified logic flow diagram for one predetermined sequence of the present invention is shown. The two figures are broken apart merely for convenience, it being understood that lines A—A, B—B, C—C and D—D are continuous. Starting with block 66, the system is activated and the algorithm begun. At block 68, the control module sets the fault counter equal to zero and sets the fault counter maximum value to a predetermined value, herein shown as "X". At block 70, the control module sets the hold counter to zero and the hold counter maximum value to a predetermined value, "Y".

At block 72, the the control module determines whether the system and its actuators are in the desired operating state, and consequently which relay should be activated. If the system is in the desired state, the control module returns and evaluates the system until a discrepancy between the desired and actual operating states arises. If the system is not in the desired state the control module proceeds to block 74.

At block 74, the control module activates the primary relay corresponding to the desired operating state and at block 76, the control module determines whether the fault counter has reached its maximum value $FC_{max}$. If the fault counter equals $FC_{max}$, a fault message is displayed at block 80. If, however, the fault counter has not reached $FC_{max}$, the primary relay is held for a time period, $T_1$ at block 78. $T_1$ is equivalent to the time period shown as T in FIG. 2. At block 82, the control module determines whether the hold counter, HC, has reached its predetermined maximum value $HC_{max}$. If not, the control module determines, at block 84, whether the system is yet in the desired state. If the system is not in the desired state, the control module proceeds to block 86, increments the hold counter and returns to block 78 wherein the primary relay is continuously held in the activated, or on, position as shown in FIG. 2 at 79. In the preferred embodiment, $HC_{max}$ is equal to 4T and the control module determines whether the system is in the desired operating state after every increment of $T_1$.

When the hold counter reaches $HC_{max}$ at block 82, the control module increments the fault counter at block 88 and proceeds to block 90. The control module may also reach block 90 if the system is in the desired state before the hold counter reaches its $HC_{max}$, at block 84. At block 90 the primary relay is deactivated for a predetermined amount of time. This deactivation allows the movable contact within the primary relay to strike the normally closed contact in an attempt to wipe off any contaminants on either the movable contact or the normally closed contact. At block 92, the control module determines whether the event requiring the activation of the primary relay has passed. If the event has passed, at block 94 the control module activates the secondary relay for a time period equal to $T_1$ as shown at 95 in FIG. 2 and returns to block 70 wherein the hold counter is reset to zero and the $HC_{max}$ is also reset to its predetermined value. $HC_{max}$ equals four in the embodiment illustrated in FIG. 2.

The control module runs the algorithm until the fault counter reaches its maximum value $FC_{max}$, at block 76. When the fault counter reaches $FC_{max}$, the control module displays a fault message to the system operator at block 80 and the primary relay is held for $T_1$ seconds in block 89. The control module then proceeds to block 90, and the algorithm is run as described above.

This sequence is dependent on the events required to generate a cycle of the algorithm. As shown in FIG. 2, a new cycle is generated after every separate event requiring a change in the desired operating state of the system. In the sequence shown in FIG. 2, three cycles are needed to generate the fault message.

By alternatively activating and deactivating the primary and secondary relays according to this sequence, the present invention is able to correct a fault in the circuit. Contaminants on any of the contacts within either of the relays are wiped away by the mechanical restriking of the movable contact during the activations and deactivations. An actuator frozen into one operating position may also be freed due to the activations and deactivations.

Operation of a system according to the present invention will now be explained with reference to the suspension system of FIG. 6 in which the adjustable suspension units 26, 28 have only two operating positions, i.e., a "normal" and a "firm" position. These positions could characterize changes in the damping or spring rates or both. Those skilled in the art will appreciate that the following example is not meant to limit the application of the present invention. Accordingly, as previously noted, a circuit according to this invention could be used to control suspension units having three or more individual damping rates or multiple spring rates or both.

During normal operation of the suspension system shown in FIG. 6, the control module's computer decides when the adjustable suspension units should be moved from the normal to the firm position and vice versa depending upon the conditions encountered by the vehicle. Assuming that an event has occurred requiring the firm damping position such as a hard braking, the algorithm starts by setting the fault counter and hold counter equal to zero at blocks 68 and 70. The $FC_{max}$ is set at two in this example and the $HC_{max}$ is set at four. After the control module 42 determines that the firm damping position is required and the suspension system is not in the required operating state, the control module activates the primary relay corresponding to the firm operating position and determines whether the fault counter has reached its $FC_{max}$. In this example the fault counter has not yet reached its $FC_{max}$ and the firm primary relay is activated for a first time period, typically between 200-400 msecs in the preferred embodiment. The hold counter is incremented at block 86 and the primary relay is held for a total of four time periods or until the actuators go into the firm position, whichever is less. The control module evaluates the position of the actuators and consequently whether the system has gone into the desired state after every time interval. If the system has not gone into the firm operating state after four time periods, the control module increments the fault counter at block 88 and deactivates the firm primary relay. The system then remains in its present damping position. When the firm event requiring the firm damping position has passed at block 92, the control module activates the secondary relay for a predetermined time period as shown at 95 in FIG. 2. After the time period, the control module deactivates the secondary relay and returns to block 70 of the algorithm.

When a second event requiring the firm damping position, such as a hard turn is made, the algorithm continues at block 74 and activates the firm primary relay again. The control module proceeds through the algorithm at cycle 2 in FIG. 2 and as discussed above. If the system does not go into the desired, or firm, operating condition, the fault counter is again incremented. When the fault counter reaches $FC_{max}$, after the third event in the preferred embodiment, the control module generates a fault message to the vehicle operator. After generating the fault message, the control module proceeds to block 89 and activates the primary relay again for a predetermined time. The control module continues with the rest of the algorithm as described above. In one embodiment of the invention the control module continues to run the algorithm while the vehicle is operated. When the vehicle is turned off, the algorithm ends and the fault message is stored in the memory of the control module. The control module begins the algorithm at block 66 every time the vehicle is started.

Figure 4:
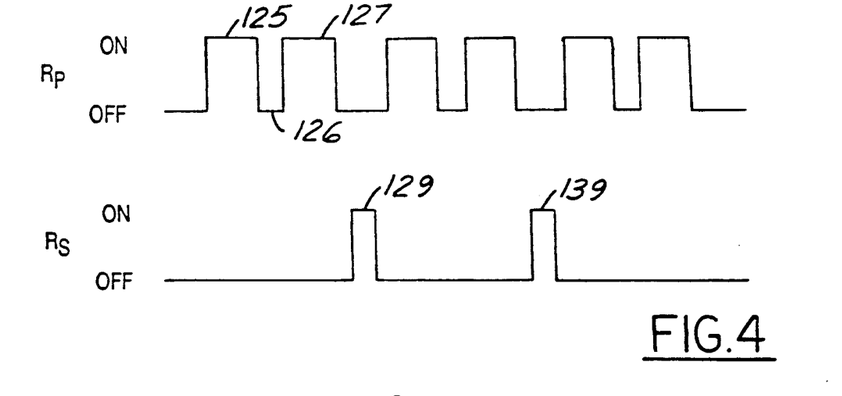
FIG. 4 illustrates an output waveform of a system employing a circuit of the present invention and operated in accordance with an alternative method of the present invention.
Figure 5A:
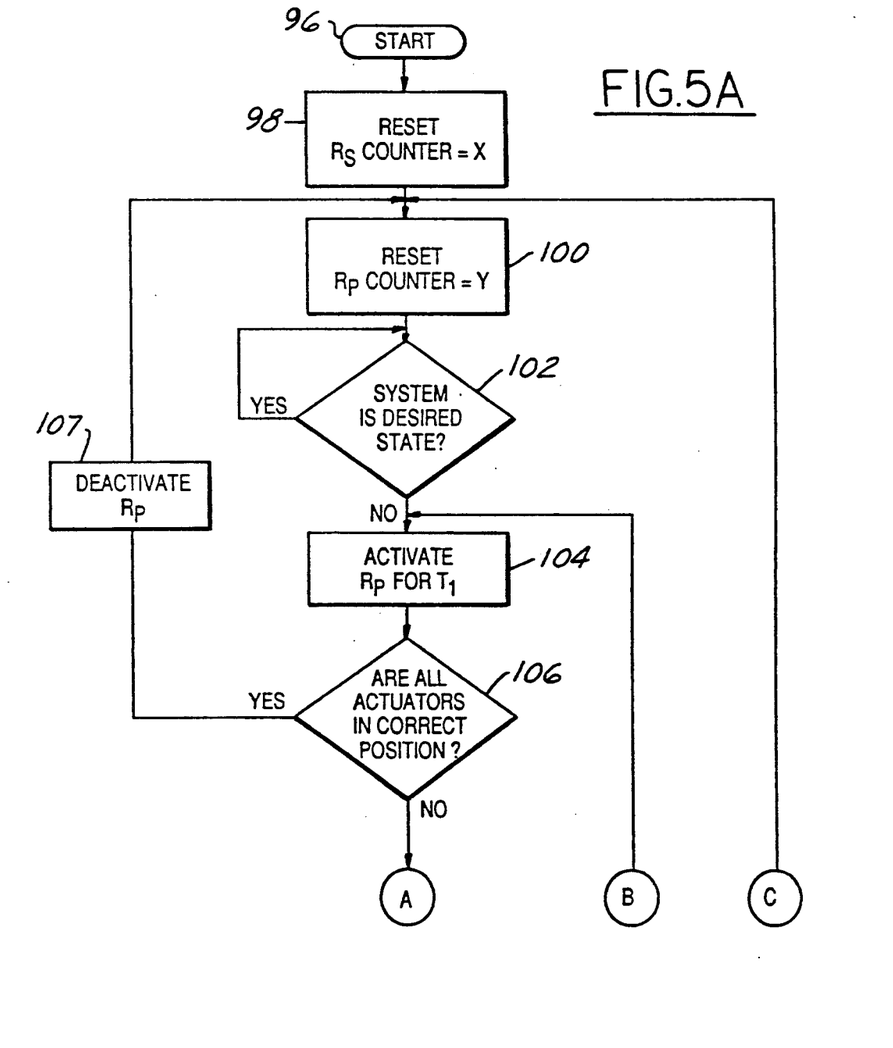
FIGS. 5A and 5B are logic flow block diagrams corresponding to the method illustrated by the output waveform of FIG. 4.
Figure 5B:
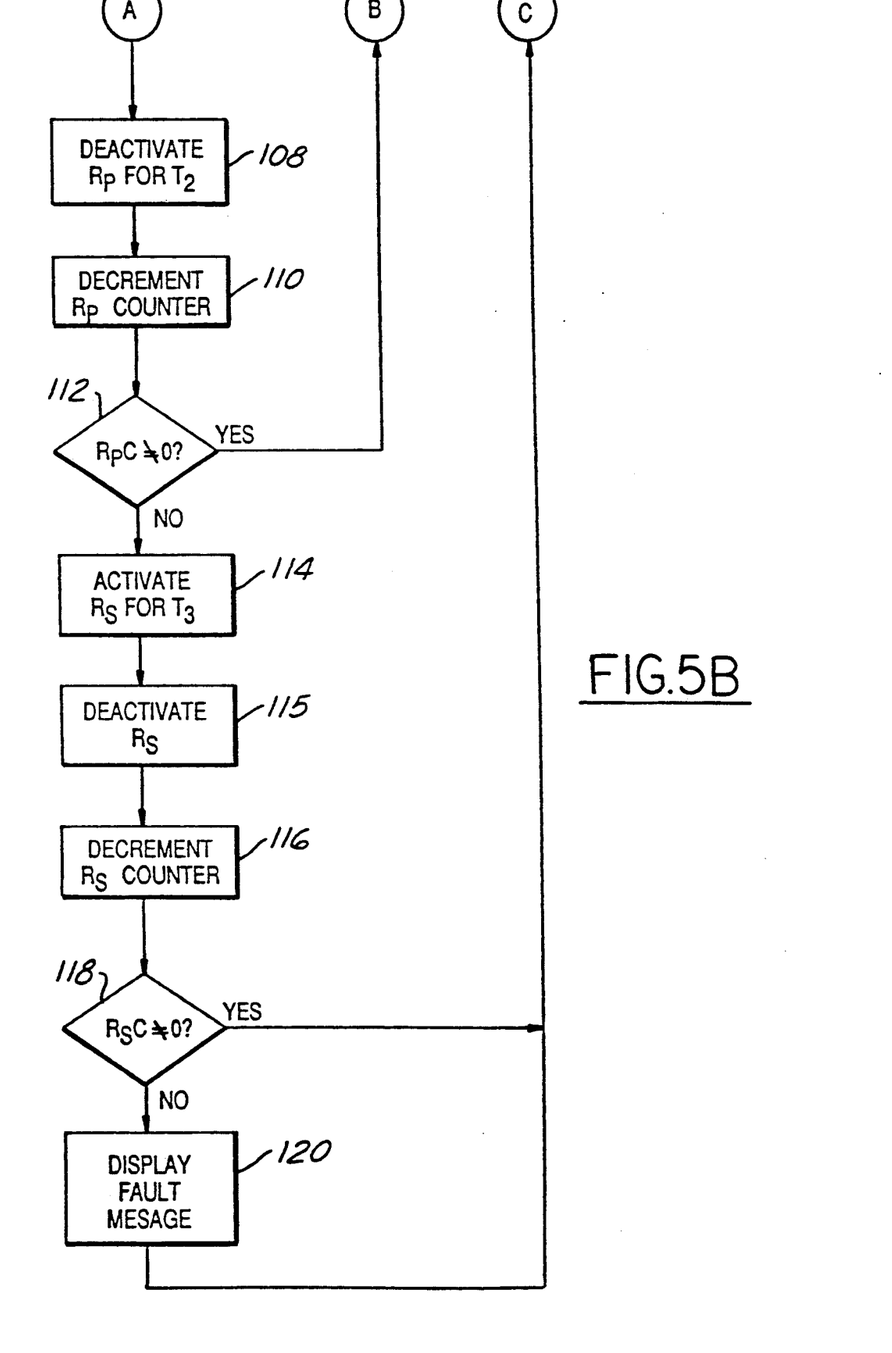

FIGS. 4, 5A and 5B represent a second predetermined sequence according to the present invention used by the control module to correct a fault in a system. FIGS. 5A and 5B are simplified logic flow diagrams for the present invention the two figures are broken apart merely for convenience, it being understood that lines A—A, B—B, and C—C are continuous. In this logic flow diagram, the following abbreviations are used:

$R_p$ is the primary relay;
$R_s$ is the secondary relay;
$R_s$ Counter ($R_sC$) is a counter for counting the number of activations of the secondary relay; and
$R_p$ Counter ($R_pC$) is a counter for counting the number of activations of the primary relay.

Starting at block 96, the control module proceeds to block 98, wherein the secondary relay counter ($R_sC$) is set to a predetermined value, herein designated as X. At block 100, the control module sets the primary relay counter ($R_pC$) to a predetermined value, herein designated as Y. In this sequence, the counters are set at a predetermined value and are decremented as the control module proceeds through algorithm. This is purely an arbitrary choice and is not meant as a limitation upon the present invention, it being understood to those skilled in the art that the counters may also be set initially at zero and incremented as the control module proceeds through the algorithm.

At block 102, the control module evaluates whether the system and its actuators are in the desired operating state. If they are, the control module evaluates the operating state of the system until there is a discrepancy between the desired and actual operating states as before. If a discrepancy exists, the control module proceeds to block 104, where the control module activates the primary relay for a first predetermined time period designated as $T_1$. This is shown at 125 in FIG. 4. In the preferred embodiment $T_1$ ranges between 50-200 msecs. At block 106, the control module determines whether all of the actuators have been placed in their correct position by activation of the primary relay. If all the actuators are in their correct position, as determined by the feedback switch, the control module deactivates the primary relay at block 107 and returns to block 100 and continues the algorithm. The control module continuously monitors the operating state of the system while the system is running to determine discrepancies between the desired and actual states as described above. If, however, the actuators are not all in the correct position, the control module proceeds to block 108 and deactivates the primary relay for a second predetermined time period $T_2$ as shown at 126 in FIG. 4. Deactivating the primary relay for this length of time allows the movable contact within this relay to travel from the normally open contact to the normally closed contact, possibly wiping any contaminant away during this movement. In the preferred embodiment, $T_2$ ranges between 15-45 msecs. The control module then decrements the primary relay counter at block 110 by one unit and proceeds to block 112 where the control module determines whether the primary relay counter equals zero.

If at block 112, the primary relay counter has not yet reached zero, meaning that the primary relay counter is at a value greater than zero, the control module returns to block 104 and activates the primary relay for the $T_1$ time period as shown by 127 in FIG. 4. The control system then proceeds through the algorithm as before until the primary relay counter equals zero. When at block 112 the primary relay counter equals zero, the control module proceeds to block 114 and activates the secondary relay for a third predetermined time period, $T_3$. This is shown in FIG. 4 at 129. In the preferred embodiment, $T_3$ ranges between 15-45 msecs.

The secondary relay is deactivated at block 115 to allow the movable contact within this relay to restrike the normally closed contact and possibly remove any contaminants on it which may have caused the fault. The control module then decrements the secondary relay counter at block 116 and proceeds to block 118 where it determines whether the secondary relay counter has reached zero. As explained above, these counters are set to a predetermined value greater than zero and are decremented as the control module loops the algorithm. It will be apparent to those skilled in the art that the counters may be set equal to zero and incremented as the control module proceeds through the algorithm.

If at block 118, the secondary relay counter is not equal to zero, the control module proceeds back to block 100 where it resets the primary relay counter to its predetermined value. The control module then proceeds through the algorithm as shown by the remaining portions of FIG. 4 until the secondary relay counter equals zero at block 118. At this point the control module proceeds to block 120 wherein the fault message is displayed to the system operator. After displaying the fault message, the control module returns to block 100 and continuously runs the algorithm while the vehicle is running. If during vehicle operation each of the actuators within the system is placed into the desired operating position after a fault message is displayed, the control module removes the fault message until a new fault is generated.

Applying this predetermined sequence to the suspension system shown in FIG. 6, again assuming that the suspension system is in the normal damping position and that the firm damping position is required, the control module sets the secondary relay counter to a value of X. In the preferred embodiment, X equals two as shown by 129 and 139 in FIG. 4. The control module sets the primary relay counter to Y, Y also being two in the preferred embodiment as shown by 125 and 127 in FIG. 4. After determining that the firm damping position is required, the control module activates the firm primary relay for $T_1$. If all of the actuators of the suspension units are in their correct positions after activating the primary firm relay, the control module deactivates the firm relay at block 107 and returns to block 100. If, however, all of the actuators are not in their correct position, as a result of contaminants on the primary or secondary relays or as a result of the actuator frozen in the wrong position, the control module proceeds to block 108 wherein the primary relay is deactivated for the $T_2$ period to allow the movable contact to restrike the normally closed contact The primary relay counter is then decremented by a unit of one. If the firm primary relay counter has not reached zero, the control module reactivates the firm relay in an attempt to get all of the actuators into their correct position. If the actuators do not all get placed into their correct position, the control module proceeds through the algorithm until the firm primary relay counter equals zero.

When the primary relay counter reaches zero at block 112, the control module activates the secondary relay as shown by 129 in FIG. 4, for the $T_3$ period and decrements the secondary relay counter. Similarly, the control module determines whether the secondary relay counter has reached zero. If not, the control module returns to block 100 and resets the firm primary relay values. If however, at block 118, the secondary relay counter has reached zero, which would mean that the secondary relay has been activated twice as shown in FIG. 4, and that the system has not gone into the desired firm damping position, the control module generates the fault message to the vehicle operator as previously described the algorithm continues to run as long as the vehicle is running. The fault message is removed if the circuit of the present invention is successful at any time in placing the suspension into the desired position. When the desired operating system is the normal position, all of the steps in the above sequence are the same, the primary relay corresponding to the normal primary relay.

By utilizing the predetermined sequences shown in FIG. 3A, 3B, 5A and 5B a fault in an automotive system may be corrected. As explained above, the faults are generally due to contaminants on either the normally closed, normally open, or movable contacts within the relays. By activating and deactivating the relays in the predetermined sequences, it may be possible to wipe off or remove the contaminant on any of the contacts through the mechanical restriking of the movable contact during the sequences. Also, if the fault generated is due to a failure of the actuator to go into the desired position, activating the primary and secondary relays according to these predetermined sequences may free a frozen actuator.

Various modifications and variations will no doubt occur to those skilled in the art to which this inventions pertains. For example, the particular algorithm chosen to operate a system according to this invention may be selected according to the dictates of a particular vehicle equipped with such a system. Similarly, although the present system has been described in terms of a computerized mode selection system comprising a microprocessor, a system according to this invention could be implemented with an electronic system or other conventional electronic circuit devices. Furthermore, the suspension units or may comprise active or passive hydraulic, pneumatic or electrical units in addition to those described herein. These and all other variations which basically rely upon the teachings by which this disclosure has advanced the art are properly considered within the scope of this invention as defined by the appended claims.

We claim:

1. A circuit for correcting a fault in an automotive system having at least two operating states, comprising:
    actuator means for placing said system into one of said at least two operating states;
    relay means operatively connected with said actuator means for driving said actuator means upon passing a current through said relay means;
    fault warning means for detecting an inability of said relay means to pass current to said actuator means to place said system into a desired operating state and for generating a fault warning signal in response to said detection; and
    control means for correcting said inability of said relay means to pass current to said actuator means by activating said relay means according to a predetermined sequence upon generation of said fault warning signal so that said actuator means can place said system into said desired operating state.

2. The circuit according to claim 1, wherein said relay means comprises at least two relays, each of said at least two relays corresponding to one of said at least two operating states.

3. The circuit according to claim 1, wherein said fault warning means further includes a feedback circuit operative to sense the position of the actuator means.

4. The circuit according to claim 3, wherein said feedback circuit comprises a switch operated by said actuator means.

5. The circuit according to claim 1, wherein said fault warning means is operative to generate a fault warning signal upon a failure of said relay means to pass current to said actuator means.

6. The circuit according to claim 1, wherein said control means further comprises a timer means for recording the amount of time said relay means is activated and a counter means for recording the number of activations of said relay means.

7. The circuit according to claim 6, wherein said relay means comprises a primary relay for driving said actuator means into a desired operating state and a secondary relay for driving said actuator means into a nondesired operating state and wherein said counter means further includes a primary relay counter for recording the number of activations of said primary relay and a secondary relay counter for recording the number of activations of said secondary relay.

8. An apparatus for correcting an inability of a plurality of multiple operating mode adjustable suspension units in an automotive vehicle to be placed in a desired operating state, comprising:
- actuator means for placing said plurality of multiple operating mode adjustable suspension units into said desired desired operating state;
- relay means operatively connected with said actuator means for driving said actuator means upon passing a current through said relay means;
- fault warning means for detecting an inability of said relay means to pass current to said actuator means to place said plurality of adjustable suspension units into said desired operating state and for generating a fault warning signal in response to said detection; and
- control means for correcting said inability of said relay means to pass current to said actuator means by activating said relay means according to a predetermined sequence upon generation of said fault warning signal so that said actuator means can place said plurality of adjustable suspension units into said desired operating state.

9. The circuit according to claim 8, wherein said fault warning means further includes a feedback circuit operative to sense the position of the actuator means.

10. The circuit according to claim 9, wherein said feedback circuit comprises a switch operated by said actuator means.

11. The circuit according to claim 8, wherein said fault warning means is operative to generate a fault warning signal upon a failure of said relay means to pass current to said actuator means.

12. The circuit according to claim 8, wherein said control means further comprises a timer means for recording the amount of time said relay means is activated and a counter means for recording the number of activations of said relay means.

13. The circuit according to claim 12, wherein said relay means comprises a primary relay for driving said actuator means into a desired operating state and a secondary relay for driving said actuators into a nondesired operating state and wherein said counter means further includes a primary relay counter for recording the number of activations of said primary relay and a secondary relay counter for recording the number of activations of said secondary relay.

14. A method for correcting a fault in an automotive system having at least two operating states, said system including a relay means operatively connected to an actuator means for placing said system into a desired operating state, and a control means for generating a fault signal in response to detection of said fault, said control means including a timer means for recording the amount of time said relay means is activated and a counter means for recording the number of activations of said relay means, said method comprising the steps of:
- a. detecting an inability of said system to be placed into said desired state of said at least two operating states; and
- b. alternatively activating and deactivating said relay means according to a predetermined sequence to correct said inability of said system to be placed into said desired state.

15. The method according to claim 14, wherein the step of alternatively activating said relay means according to said predetermined sequence further includes the steps of:
- a. activating said relay means for a first predetermined amount of time to drive said actuator means to place said system into a desired position;
- b. evaluating the operating state of said system to determine whether the system is placed in the desired state;
- c. adjusting said counter means if said system is not in said desired state;
- d. activating said relay means for a second predetermined amount of time to drive said actuator means to place said system into a nondesired position; and
- e. generating a fault signal if said system is not in said desired state after said counter means reaches a predetermined value.

16. The method according to claim 14, wherein said relay means includes a primary relay and a secondary relay, and wherein the step of alternatively activating and deactivating said relay means further includes the steps of:
- a. evaluating said system's desired operating state and activating said primary relay in response to said desire for a first predetermined amount of time to drive said actuator means to place said system into said desired operating state;
- b. evaluating the operating state of said system to determine whether the system is placed in the desired operating state;
- c. deactivating said primary relay for a second predetermined amount of time and adjusting said primary relay counter if said system is not in said desired state;
- d. determining whether said primary relay counter has reached a predetermined value and repeating steps (a)-(c) until said primary relay counter reaches a predetermined value;
- e. activating said secondary relay for a third predetermined amount of time when said primary relay counter reaches said predetermined value and adjusting said secondary relay counter if said system is not in said desired state;
- f. deactivating said secondary relay for a fourth predetermined amount of time;
- g. repeating steps (a)-(f) until said secondary relay counter reaches a second predetermined value; and
- h. generating a fault signal when said secondary relay counter reaches said second predetermined value.

17. A method for correcting a fault in an automotive system having at least two operating states, said system including a relay means operatively connected to an actuator means for placing said system into a desired operating state, and a control means for generating a fault signal in response to detection of said fault, said control means including a timer means for recording the amount of time said relay means is activated and a counter means for recording the number of activations of said relay means, said method comprising the steps of:
- a. detecting an inability of said system to be placed into said desired state of said at least two operating states; and
- b. alternatively activating and deactivating said relay means according to a predetermined sequence to correct said inability of said system to be placed into said desired state, said step further including the steps of:
  - i. activating said relay means for a first predetermined amount of time to drive said actuator means to place said system into a desired position;

ii. evaluating the operating state of said system to determine whether the system is placed in the desired state;

iii. adjusting said counter means if said system is not in said desired state;

iv. activating said relay means for a second predetermined amount of time to drive said actuator means to place said system into a undesired position; and v. generating a fault signal if said system is not in said desired state after said counter means reaches a predetermined value.

* * * * *